United States Patent [19]

Hansen et al.

[11] 4,210,414
[45] Jul. 1, 1980

[54] DYE MIXTURES FOR COLORING MINERAL OIL PRODUCTS

[75] Inventors: Guenter Hansen, Ludwigshafen; Franz Merger, Frankenthal; Gerhard Nestler, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 891,839

[22] Filed: Mar. 30, 1978

[30] Foreign Application Priority Data

Apr. 15, 1977 [DE] Fed. Rep. of Germany ....... 2716674

[51] Int. Cl.$^2$ .................. C09B 46/00; C10L 1/10; D06P 1/02
[52] U.S. Cl. ............................ 8/639; 44/59; 260/191; 208/12
[58] Field of Search ................ 260/191; 44/59; 8/26; 208/12

[56] References Cited

U.S. PATENT DOCUMENTS

| | | | |
|---|---|---|---|
| 1,986,116 | 1/1935 | Payne | 260/191 |
| 3,004,821 | 10/1961 | Gano | 260/191 X |
| 3,034,848 | 5/1962 | King | 44/59 |
| 3,049,533 | 8/1962 | Spitzer et al. | 260/197 |
| 3,056,642 | 10/1962 | Kesler et al. | 260/191 X |
| 3,073,664 | 1/1963 | Spitzer et al. | 44/59 X |
| 3,356,443 | 12/1967 | Oziomba | 260/208 X |
| 3,494,714 | 2/1970 | Litke | 260/191 X |
| 4,082,501 | 4/1978 | Mees et al. | 260/196 X |

FOREIGN PATENT DOCUMENTS 40-14311 8/1965 Japan .............................. 8/26

OTHER PUBLICATIONS

Derwent Japanese Patents Report, vol. 4, No. 27, p. 9, No. 14275/65 (8-11-1965).

*Primary Examiner*—Floyd D. Higel
*Attorney, Agent, or Firm*—Oblon, Fisher, Spivak, McClelland & Maier

[57] ABSTRACT

Mixtures of dyes of the formula

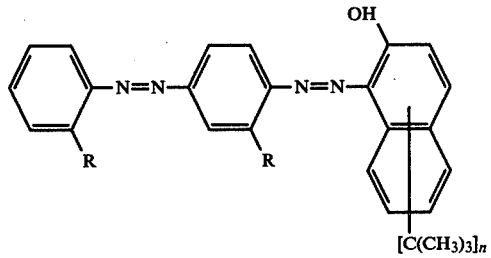

where R is hydrogen or methyl and n is a number from 0 to 6 are exceptionally suitable—especially when used in the form of stock solution—for coloring mineral oil products.

3 Claims, No Drawings

DYE MIXTURES FOR COLORING MINERAL OIL PRODUCTS

BACKGROUND OF THE INVENTION

Summary of the Invention

The present invention relates to mixtures of dyes of the formula

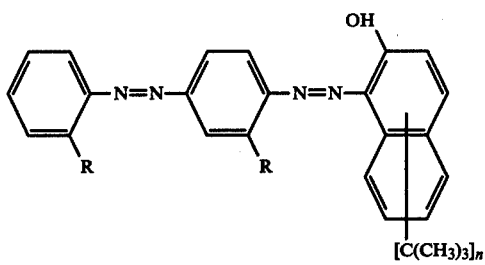

where R is hydrogen or methyl and n is a number from 0 to 6.

DESCRIPTION OF THE PREFERRED EMBODIMENTS

Preferably, n is 0, 1 or 2. Particularly preferred mixtures comprise the following dyes
 (a) R=H n=0
 (b) R=CH$_3$ n=0
 (c) R=H n=1 and
 (d) R=CH$_3$ n=1,
which still contain certain amounts of dyes with n=2 and very small amounts with n>2.

The dye mixtures in particular contain at least 10% and at most 90% of one of the dyes (a) to (d); mixtures which contain the dyes in about equal amounts are preferred. In mixtures with unequal amounts, the dyes where R=CH$_3$ are preferred.

The dye mixtures may be prepared by synthesizing the individual dyes and mixing them or, more advantageously, by carrying out the synthesis with a mixture of diazo components and coupling components. The method of preparation of the dyes, by diazotization and coupling, exhibits no unusual features.

Surprisingly, the dye mixtures of the invention exhibit excellent solubility in solvents which are conventionally used for the preparation of stock solutions, for example for coloring fuel oil. Specific examples of such solvents are toluene, xylene and high-boiling (e.g. 180 bis 250° C.) aromatic mixtures (for example with products known under the tradenames Shellsol and Solvent Naphtha).

The dye mixtures of the invention are therefore exceptionally useful, for example, for preparing stock solutions containing a large amount of dye, e.g. 3 to 10%.

In the Examples which follow, parts and percentages are by weight, unless stated otherwise.

EXAMPLE 1

19.7 parts of 4-aminoazobenzene and 22.5 parts of 4-amino-3,2'-dimethylazobenzene are stirred with a mixture of 350 parts of water and 60 parts of 10N hydrochloric acid for about 3 hours at room temperature and after adding 200 parts of ice, a concentrated aqueous solution of 13.8 parts of sodium nitrite is introduced. The diazotization is complete in from 3 to 4 hours at from 0° to 5° C.; the excess nitrite is then removed in the conventional manner with amidosulfonic acid. Thereafter, the suspension of the diazonium salt mixture is added dropwise to an ice-cooled emulsion of 15.1 parts of β-naphthol and 21.0 parts of tert.-butyl-naphthol in 200 parts of water, 12 parts of KOH and 100 parts of ice.

Sodium acetate solution is then added until the pH reaches a value of from 3 to 4. After stirring overnight, the coupling is complete. The product is filtered off, washed neutral with water and dried under reduced pressure at 60° C.

The dye mixture obtained, which contains the dyes

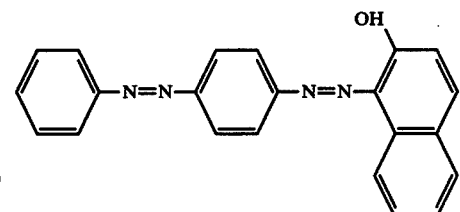

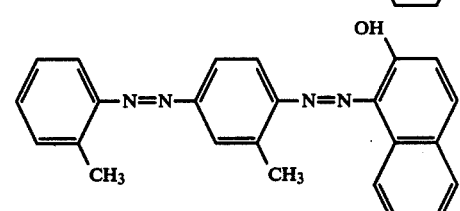

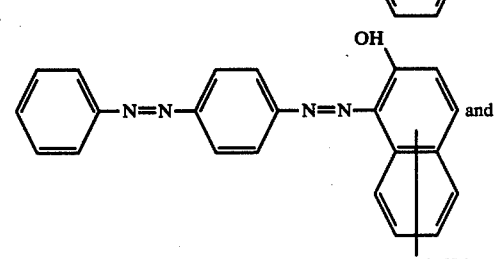

and

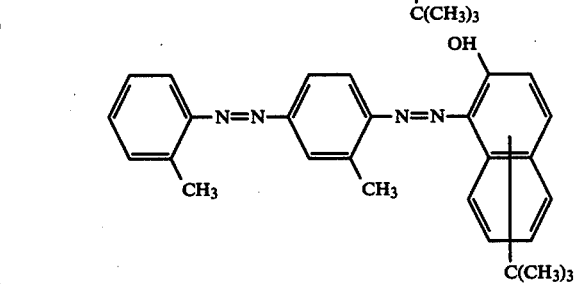

is readily soluble in aromatics and is therefore very suitable for coloring motor fuels, heating oils, surface coatings, waxes and fats.

Using the method described above, the mixtures of components shown in the Table which follows also give dye mixtures distinguished by excellent solubility.

| Example | 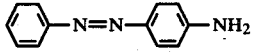 | 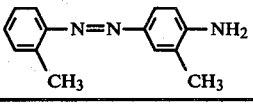 | 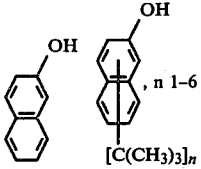 |  | Hue |
|---|---|---|---|---|---|
| 2  | 29.5 parts  | 11.25 parts | 15.1 parts | 21.0 parts, n = 1 | red |
| 3  | 35.45 parts | 4.5 parts   | 15.1 parts | 21.0 parts, n = 1 | " |
| 4  | 9.85 parts  | 33.75 parts | 15.1 parts | 21.0 parts, n = 1 | " |
| 5  | 3.94 parts  | 40.5 parts  | 15.1 parts | 21.0 parts, n = 1 | " |
| 6  | 3.94 parts  | 40.5 parts  | 27.2 parts | 4.2 parts, n = 1  | " |
| 7  | 19.7 parts  | 22.5 parts  | 15.1 parts | 26.9 parts, n = 2 | " |
| 8  | 19.7 parts  | 22.5 parts  | 15.1 parts | 38.6 parts, n = 4 | " |
| 9  | 3.94 parts  | 40.5 parts  | 15.1 parts | 38.6 parts, n = 4 | " |
| 10 | 3.94 parts  | 40.5 parts  | 3.0 parts  | 90.7 parts, n = 6 | " |
| 11 | 3.94 parts  | 40.5 parts  | 3.0 parts  | 58.9 parts, n = 3 | " |

What is claimed as new and intended to be covered by Letters Patent is:

1. A mixture of dyes of the formula

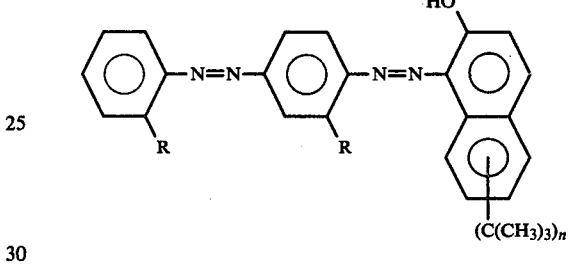

wherein the mixture contains 10–90% of a dye with n=0 and 10–90% of a dye with n=1-6, and wherein R is hydrogen or methyl.

2. A dye mixture as claimed in claim 1, wherein n is 0, 1 or 2.

3. A dye mixture as claimed in claim 1, wherein the dyes with n=0 and n=1 are present in about equal amounts.

* * * * *